(12) United States Patent
Kellogg et al.

(10) Patent No.: US 12,492,742 B2
(45) Date of Patent: *Dec. 9, 2025

(54) DIFFERENTIALS WITH FACE GEARS FOR ELECTRICAL DRIVE SYSTEMS

(71) Applicant: BorgWarner Inc., Auburn Hills, MI (US)

(72) Inventors: Philip R. Kellogg, Macomb, MI (US); Tao Peng, Canton, MI (US); Robert J. Cabrera, Oxford, MI (US); Marcello Ciparullo, Rochester Hills, MI (US); Aaron A. Sinka, Rochester Hills, MI (US); James S. Bourn, Oxford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/789,864

(22) Filed: Jul. 31, 2024

(65) Prior Publication Data

US 2025/0092943 A1 Mar. 20, 2025

Related U.S. Application Data

(63) Continuation-in-part of application No. 18/368,628, filed on Sep. 15, 2023, now Pat. No. 12,253,153.

(51) Int. Cl.
*F16H 48/40* (2012.01)
*B60K 1/00* (2006.01)
*F16H 48/08* (2006.01)

(52) U.S. Cl.
CPC ........ *F16H 48/40* (2013.01); *B60K 2001/001* (2013.01); *F16H 2048/085* (2013.01)

(58) Field of Classification Search
CPC ...... H02K 7/006; H02K 7/116; H02K 7/1163; F16D 2001/103; B60K 1/00; B60K 1/02;
(Continued)

(56) References Cited

U.S. PATENT DOCUMENTS 2,569,533 A 10/1951 Morgan
3,154,969 A * 11/1964 Saari .......................... F16H 1/30
475/227

(Continued)

FOREIGN PATENT DOCUMENTS

CN 202716729 U 2/2013
CN 107781378 A 3/2018
(Continued)

OTHER PUBLICATIONS

English language abstract and machine-assisted English translation for CN 107781378 A extracted from espacenet.com database on Sep. 12, 2024, 5 pages.

(Continued)

*Primary Examiner* — James J Taylor, II
(74) *Attorney, Agent, or Firm* — Howard & Howard Attorneys PLLC (57) ABSTRACT

An electric drive system in a battery electric vehicle (BEV) includes an output shaft, configured to couple with a drive wheel of the BEV, having a face gear at a distal end; a differential, including a pinion gear cage receiving pinion gears rotatably connected to the pinion gear cage via gear pins, having radially-outwardly-facing gear teeth that are oriented at a non-zero angle relative to an axis of rotation; and a housing receiving the differential that is configured to couple to a rotating electrical machine of the BEV, and engages the radially-outwardly-facing gear teeth preventing radial and axial movement of the differential relative to the housing, wherein the pinion gears engage the face gear and (Continued)

permit angular displacement of the output shaft relative to another output shaft.

13 Claims, 7 Drawing Sheets

(58) Field of Classification Search
CPC ...... B60K 2001/001; B60K 17/16–165; B60K 17/20; B60K 17/36; B60L 15/007; B60L 15/2036; F16H 2200/0021; F16H 37/08–0826
See application file for complete search history.

(56) References Cited

U.S. PATENT DOCUMENTS

| | | | |
|---|---|---|---|
| 4,467,230 A | 8/1984 | Rovinsky | |
| 5,759,128 A | 6/1998 | Mizutani et al. | |
| 6,811,511 B2 | 11/2004 | Zeise | |
| 7,220,207 B2* | 5/2007 | Yamamoto | B60K 17/16 475/150 |
| 8,438,732 B2* | 5/2013 | Palfai | F16H 48/08 29/893 |
| 9,011,285 B2 | 4/2015 | Markl | |
| 9,255,633 B2 | 2/2016 | Märkl | |
| 11,005,337 B2 | 5/2021 | Hung et al. | |
| 11,110,793 B2 | 9/2021 | Takahashi et al. | |
| 11,365,765 B2* | 6/2022 | Akita | B60K 17/22 |
| 11,708,884 B2 | 7/2023 | Ullagaddi et al. | |
| 12,253,153 B1* | 3/2025 | Kellogg | F16H 48/40 |
| 2003/0015359 A1 | 1/2003 | Hanscombe | |
| 2019/0299992 A1 | 10/2019 | Lian et al. | |
| 2025/0091432 A1* | 3/2025 | Kellogg | B60K 7/0007 |

FOREIGN PATENT DOCUMENTS

| | | |
|---|---|---|
| CN | 112883485 A | 6/2021 |
| DE | 19860618 C1 | 5/2000 |
| DE | 102011114322 A1 | 3/2013 |
| DE | 102017211881 A1 | 1/2019 |
| WO | 2011006553 A1 | 1/2011 |
| WO | WO-2018100988 A1 * | 6/2018 |

OTHER PUBLICATIONS

English language abstract and machine-assisted English translation for CN 202716729 U extracted from espacenet.com database on Sep. 12, 2024, 7 pages.
English language abstract and machine-assisted English translation for DE 198 60 618 C1 extracted from espacenet.com database on Sep. 12, 2024, 17 pages.
U.S. Appl. No. 18/796,340, filed Aug. 7, 2024.
U.S. Appl. No. 18/368,628, filed Sep. 15, 2023.
Woodgears, "Gear Ratios and Compound Gear Ratios Webpage", <https://woodgears.ca/gear/ratio.html,> 2017, 11 pages.
International Search Report for Application No. PCT/US2024/046592 dated Dec. 4, 2024, 2 pages.
English language abstract and machine-assisted English translation for DE 10 2011 114 322 A1 extracted from espacenet.com database on Jan. 2, 2025, 10 pages.
International Search Report for Application No. PCT/US2025/039223 dated Oct. 20, 2025, 2 pages.

* cited by examiner

DIFFERENTIALS WITH FACE GEARS FOR ELECTRICAL DRIVE SYSTEMS

PRIORITY CLAIM

The present application is a continuation-in-part claiming priority to application Ser. No. 18/368,628 filed Sep. 15, 2023 the entire contents of which are incorporated by reference.

TECHNICAL FIELD

The present application relates to battery or hybrid electric vehicles and, more particularly, to differentials used with the vehicles.

BACKGROUND

Vehicles commonly employ mechanical differentials to transmit rotational force from an engine to the wheels of the vehicle while also compensating for different angular wheel velocities when the vehicle turns. Given the power output of modern vehicles, the mechanical differentials can be designed to handle significant torque delivered by the engine. Given the level of torque received by the differential, the gear design included in the differential may be chosen to robustly cope with the torque. For instance, the differential may use bevel gears to reliably communicate torque from the engine through the differential to the wheels of the vehicle. However, the use of bevel gears can involve significant expense. It would be helpful to have a drive system that had more design flexibility such that other gear designs could be used while robustly communicating torque to vehicle wheels.

SUMMARY

In one implementation, an electric drive system in a battery electric vehicle (BEV) includes an output shaft, configured to couple with a drive wheel of the BEV, having a face gear at a distal end; a differential, including a pinion gear cage receiving pinion gears rotatably connected to the pinion gear cage via gear pins, having radially-outwardly-facing gear teeth that are oriented at a non-zero angle relative to an axis of rotation; and a housing receiving the differential that is configured to couple to a rotating electrical machine of the BEV, and engages the radially-outwardly-facing gear teeth preventing radial and axial movement of the differential relative to the housing, wherein the pinion gears engage the face gear and permit angular displacement of the output shaft relative to another output shaft.

In another implementation, an electric drive system in a BEV includes an output shaft, configured to couple with a drive wheel of the BEV, having a face gear at a distal end; a differential, including a pinion gear cage receiving pinion gears rotatably connected to the pinion gear cage via gear pins, having radially-outwardly-facing gear teeth that are oriented at a non-zero angle relative to an axis of rotation; a housing receiving the differential that is configured to couple to a rotating electrical machine of the BEV, and engages the radially outwardly-facing gear teeth preventing radial and axial movement of the differential relative to the housing; and one or more reduction gearboxes coupled to the output shaft and configured to couple to a drive wheel of the BEV, wherein the pinion gears engage the face gear and permit angular displacement of the output shaft relative to another output shaft.

DETAILED DESCRIPTION

A battery electric vehicle (BEV) can include an electric motor directly coupled to a differential that uses face gears to drive a plurality of wheels of the BEV. The differential can be coupled in a way that it is substantially coaxial with an output shaft of the electric motor. One or more gearsets are coupled between an output of the differential and a driven wheel of the BEV such that a gear ratio between the wheel and the output of the differential permits loads within face gear rated load values. In one example, the gear ratio between an output shaft of the rotating electrical machine and the drive wheel can be eight to one or greater.

Figure 1:
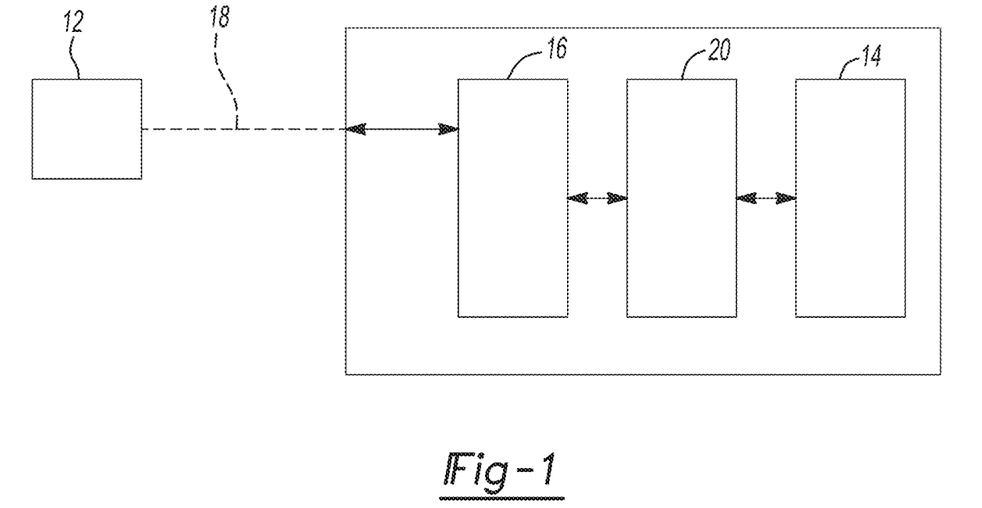
FIG. 1 is a block diagram depicting an implementation of a battery electric vehicle (BEV) having a differential.

Turning to FIG. 1, an implementation of a battery electric vehicle (BEV) is shown. The BEV 10 can detachably couple to an electrical grid 12 and can receive electrical power from the grid 12. The electrical grid 12 can include any one of a number of electrical power generators and electrical delivery mechanisms. Electrical generators (not shown) create AC electrical power that can then be transmitted a significant distance away from the electrical generator for residential and commercial use. The electrical generator can couple with the electrical grid 12 that transmits the AC electrical power from the electrical generator to an end user, such as a residence or a business.

The BEV 10 includes an electric drive system 14 including one or more rotating electrical machines (also referred to as electric motors) that have a stator with stator windings and a rotor that can be angularly displaced relative to the stator (not shown). The rotor can be coupled with a differential that may be concentrically positioned with respect to the rotor, such that an outer surface of the differential is concentrically received by a radially-inwardly-facing surface of the rotor. In one implementation, the rotating electrical machine is a permanent magnet synchronous electrical machine, which includes a rotor having a plurality of angularly-spaced permanent magnets. The permanent magnets can be made from any one of a number of different materials, one example of which is a neodymium alloy or other rare earth element. The electric drive system 14 can also include a differential and one or more transmissions, as will be described below in greater detail. The stator windings can receive electrical current the supply of which can be regulated by a control system 16 that induces the angular displacement of the rotor relative to the stator. The control system 16 can include an array of power control electronics and microprocessors that facilitate the operation of the rotating electrical machine 16. These electronics may include an inverter implemented using a plurality of MOSFETs that switch on and off according to a choreographed order and timing at the direction of a motor controller to induce rotor angular movement. The control system 16 can output current commands that regulate the electrical current supplied from a vehicle battery 20 to the rotating electrical machine 14. The current commands can be implemented using one or more microprocessors having input/output and non-volatile memory where data can be stored and accessed. The control system 16 can also include a DC-DC converter to regulate voltage levels of electrical power supplied to the electrical machine 14.

BEV service equipment (not shown), also referred to as a BEV charging station, can receive AC electrical power from the grid 12 and provide the electrical power to the BEV 10. An electrical cable 18 can detachably connect with an electrical receptacle on the BEV 10 and electrically link a BEV charging station with the vehicle battery 20 so that AC electrical power can be communicated between the charging station, rectified into DC electrical power, and then used to charge the vehicle battery 20. The BEV charging station can be classified as "Level 2" BEV service equipment that receives 240 VAC from the grid 12 and supplies 240 VAC to the BEV 10 such that the AC electrical power is rectified at the BEV 10. It is possible the level of AC electrical power input to a charging station and/or the level of AC electrical power output from a charging station is different in other implementations.

The term "battery electric vehicle" or "BEV" can refer to vehicles that are propelled, either wholly or partially, by rotating electrical machines or motors. BEV can refer to electric vehicles, plug-in electric vehicles, hybrid electric vehicles, and battery powered vehicles. The vehicle battery 20 can supply DC electrical power, that has been converted from AC electrical power, to the electrical machine(s) 14 that propel the BEV 10. As noted above, the control system 16 can convert the DC electrical power into AC electrical power to induce angular movement of the rotor relative to the stator. The vehicle battery 20 or batteries are rechargeable and can include lead-acid, nickel cadmium (NiCd), nickel metal hydride, lithium-ion, and lithium polymer batteries, to name a few. A typical BEV battery voltage is 200 to 800 VDC. The term "electric drive system" can include not only the electric motor but also the inverter, the vehicle battery, and other electrical components of the BEV.

Figure 2:
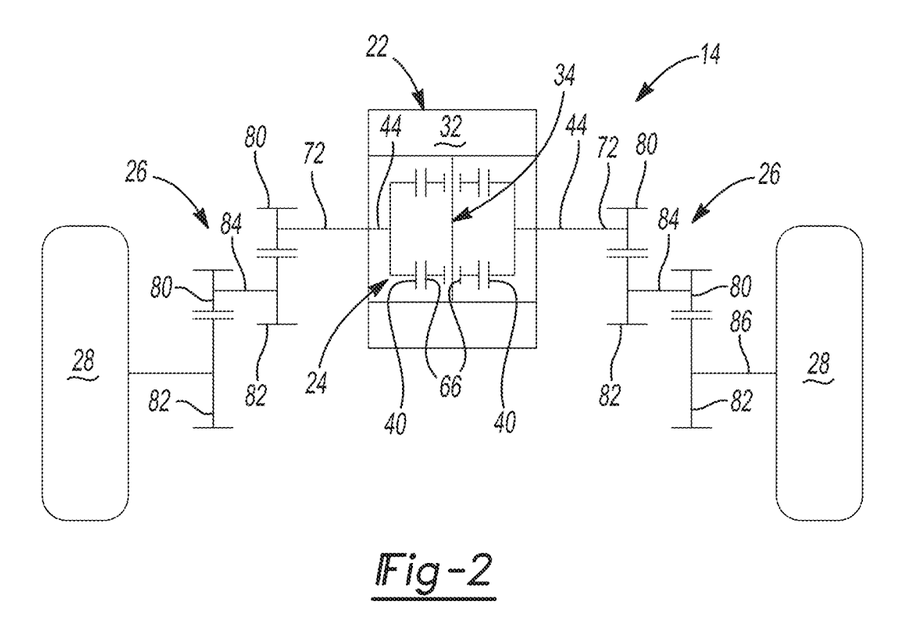
FIG. 2 is a schematic depicting an implementation of an electrical drive system that includes a differential in a BEV.
Figure 3:
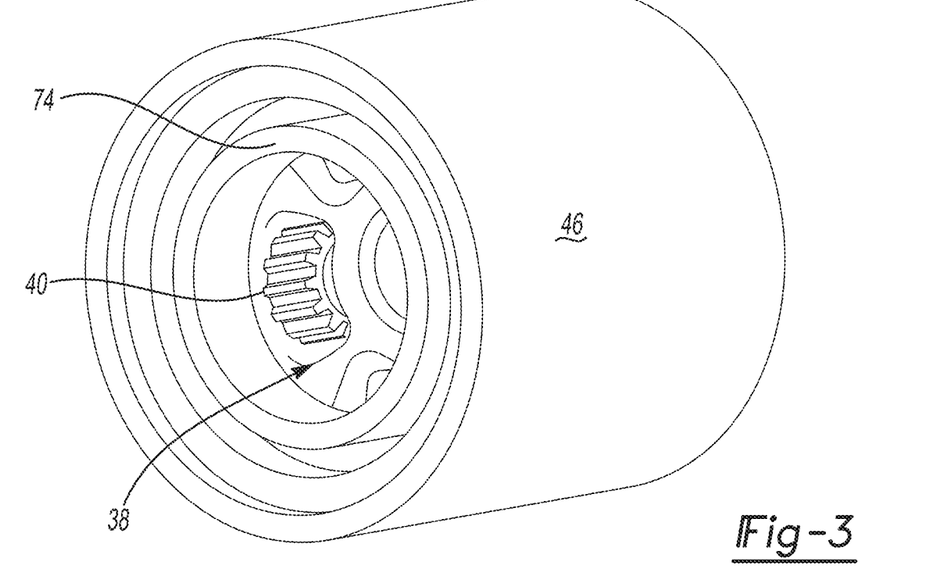
FIG. 3 is a perspective view depicting an implementation of a differential used in an electrical drive system of a BEV.
Figure 4:
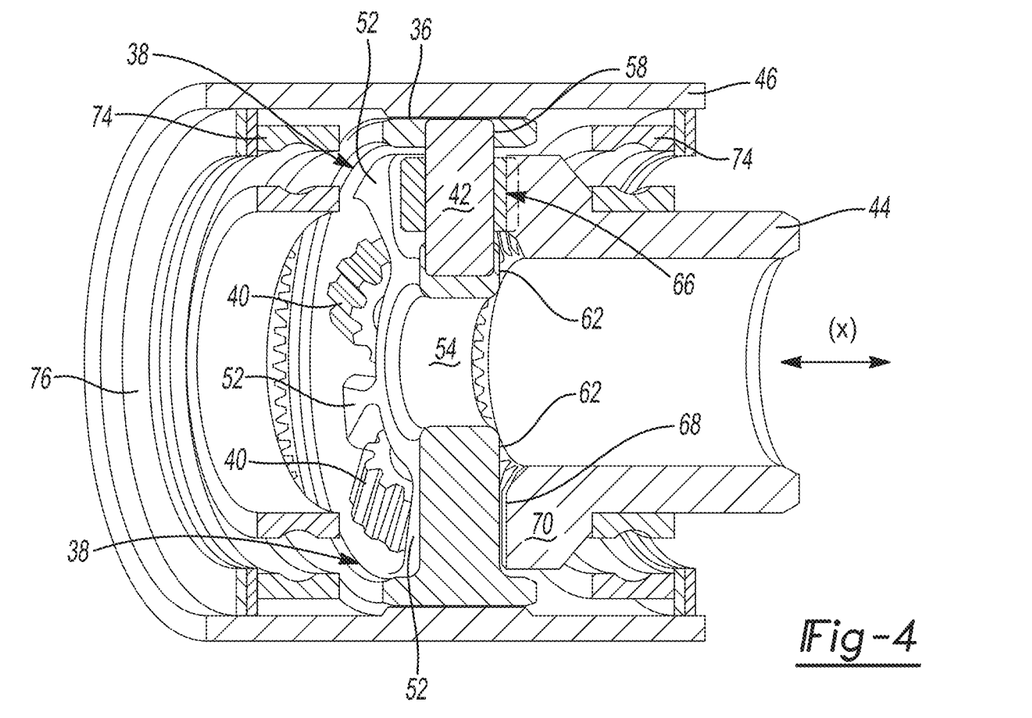
FIG. 4 is a cross-sectional view depicting an implementation of a differential used in an electrical drive system of a BEV.
Figure 5:
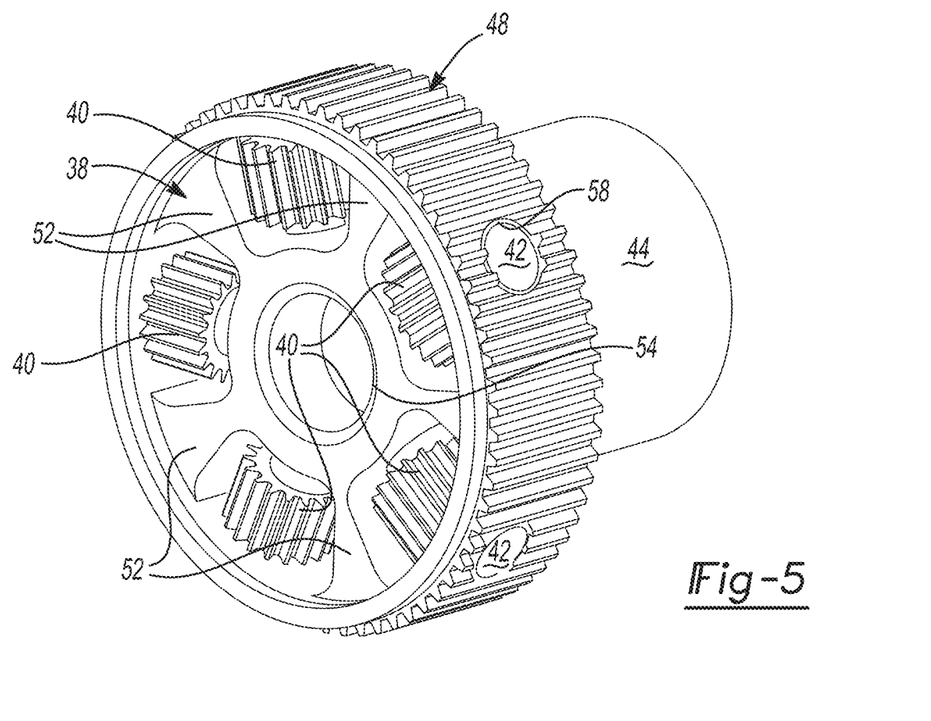
FIG. 5 is a perspective view depicting an implementation of a portion of a differential used in an electrical drive system of a BEV.
Figure 6:
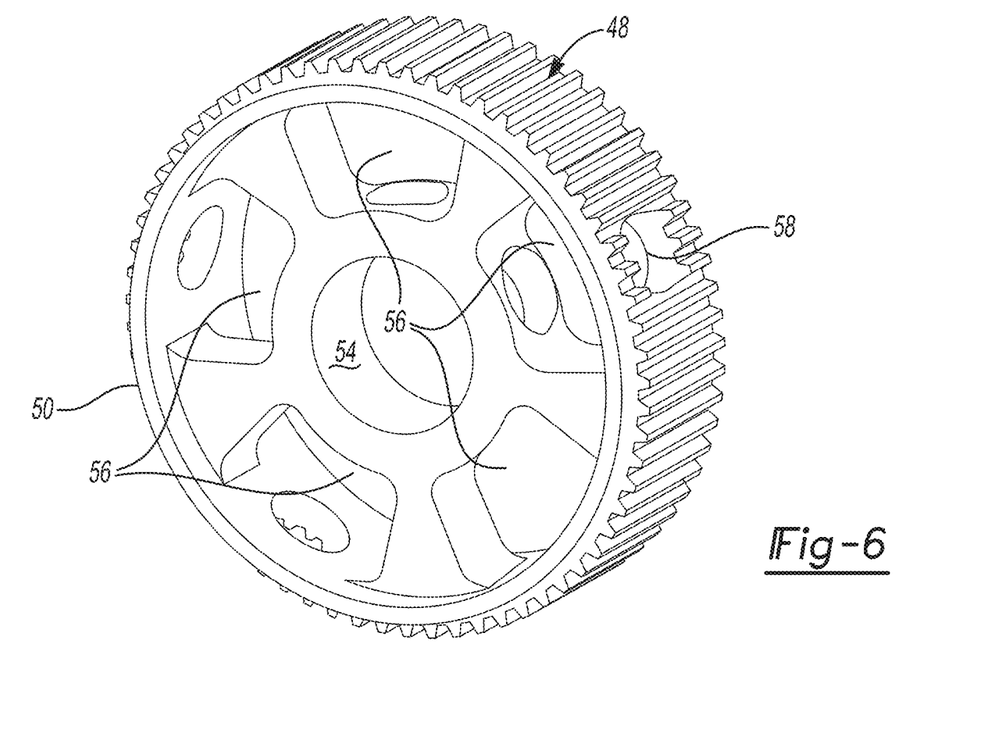
FIG. 6 is a perspective view depicting an implementation of a portion of a differential used in an electrical drive system of a BEV.
Figure 7:
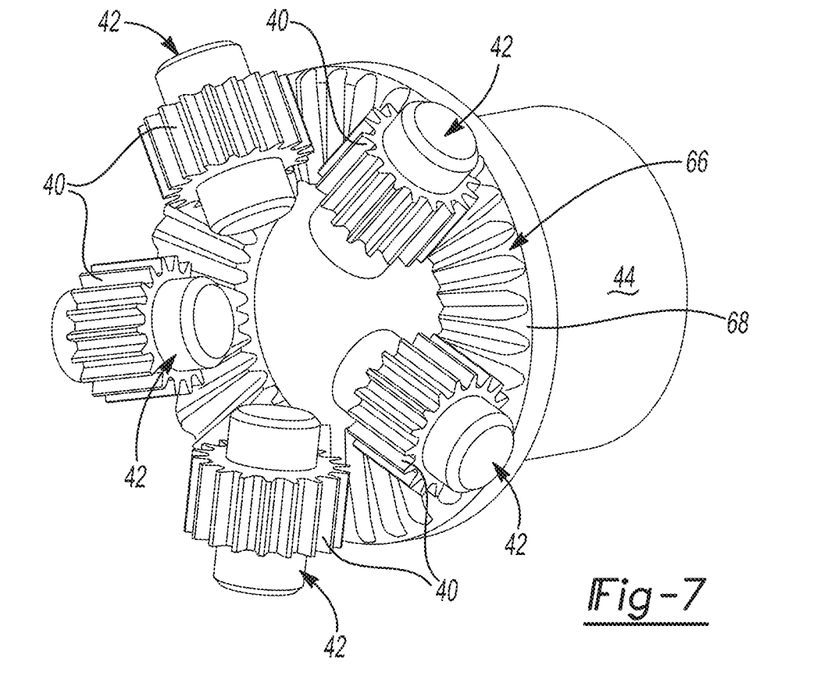
FIG. 7 is a perspective view depicting an implementation of a portion of a differential used in an electrical drive system of a BEV.
Figure 8:
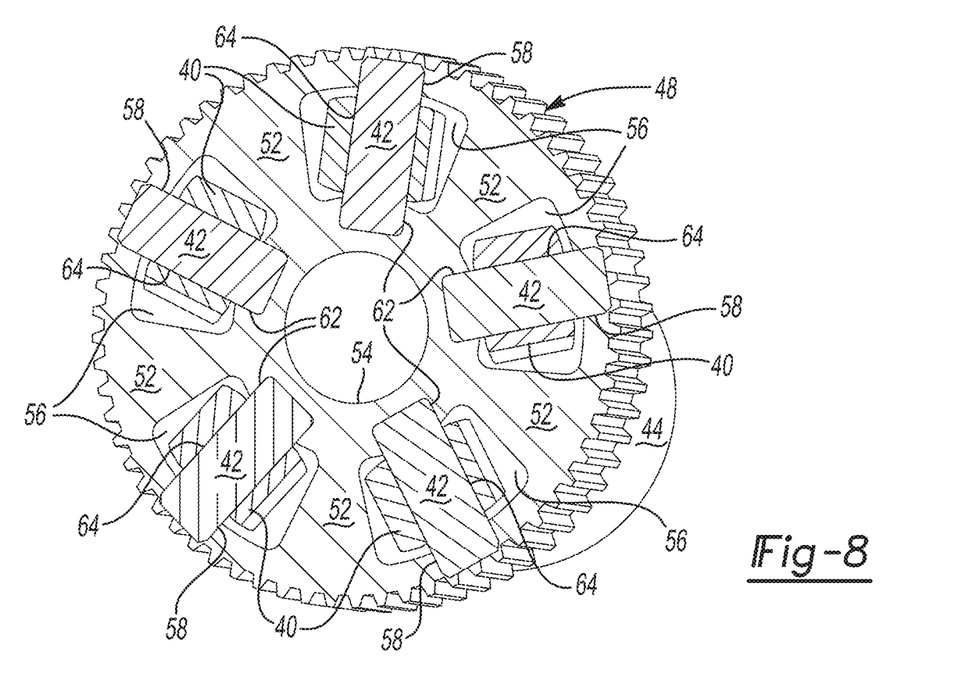
FIG. 8 is a cross-sectional view depicting an implementation of a portion of a differential used in an electrical drive system of a BEV.
Figure 9:
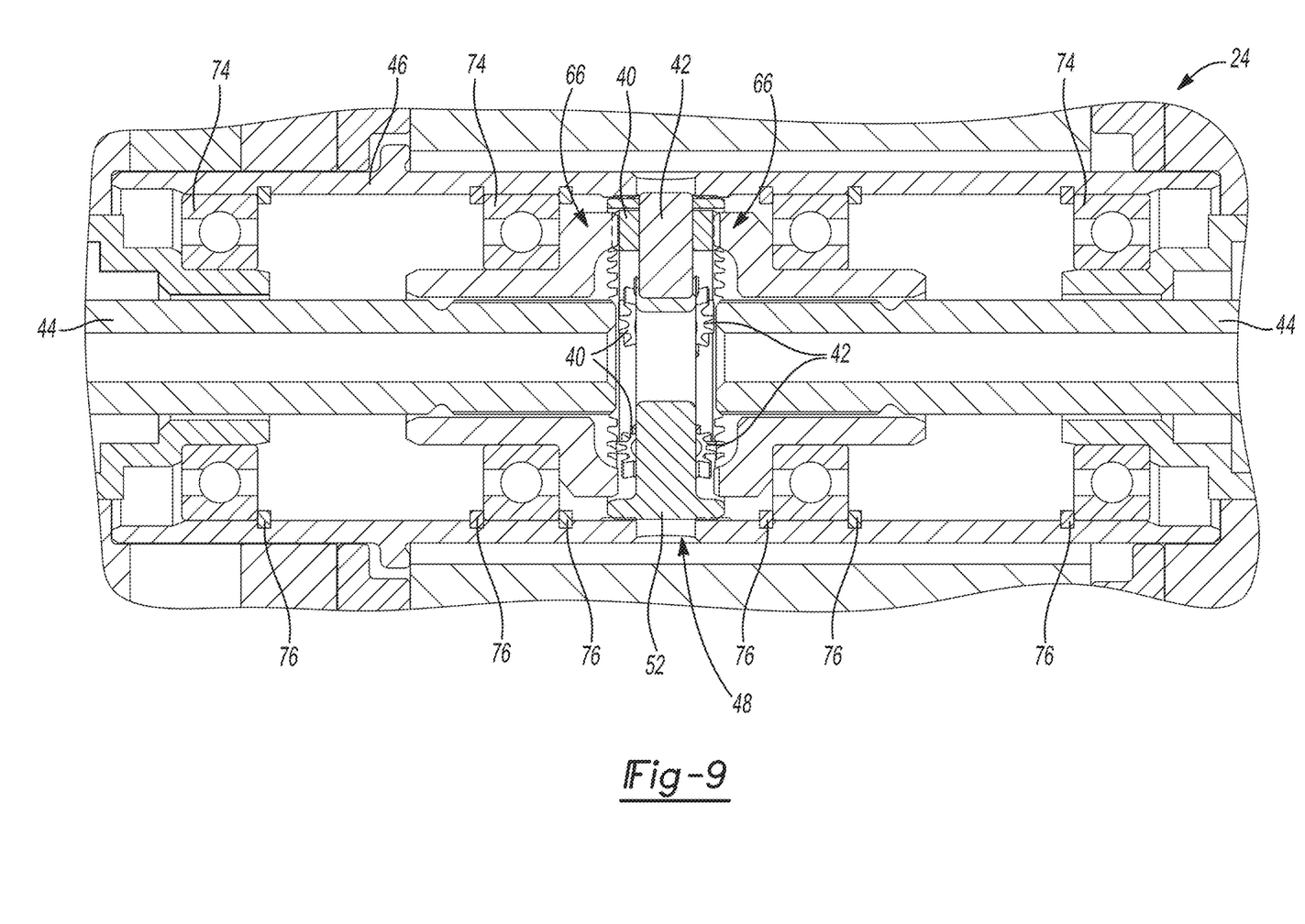
FIG. 9 is a cross-sectional view depicting an implementation of a portion of a differential used in an electrical drive system of a BEV.

FIG. 2 depicts an implementation of the electrical drive system 14 used in the BEV 10. The electrical drive system 14 can include a rotating electrical machine 22, a differential 24, and reduction gearboxes 26 coupled to the differential 24 and the driven wheels 28 of the BEV 10. The rotating electrical machine 22 includes a stator 32 having stator windings received within slots in the stator 32. The rotating electrical machine 22 can also include a rotor 34 having an inner diameter 36 (shown in FIG. 4) configured to engage with the differential 24 and translate rotational movement of the rotor 34 to the differential 24. The rotor 34 is received within the stator 32 such that as the stator windings receive electrical current, the rotor 34 is angularly displaced relative to the stator 32.

The differential 24 includes a pinion gear cage 38, pinion gears 40, and gear pins 42 that hold the pinion gears 40 in the cage 38, two output shafts 44, and a housing 46 as shown in FIGS. 3-9. The pinion gear cage 38 can have a substantially cylindrical shape and a ring gear 48 circumferentially positioned around an outer surface 50 of the cage 38. The ring gear 48 can include radially-outwardly-facing gear teeth. The pinion gear cage 38 can include a plurality of spokes 52 and a central hub 54 that collectively define pinion gear slots 56 circumferentially positioned within the cage 38 between the spokes 52 and shaped to receive pinion gears 40. Apertures 58 in the outer axial surface 60 of the pinion gear cage 38 can be shaped to closely conform to the outer surface of gear pins 42 and receptacles 62 in the hub 54 can be shaped to receive an end of the gear pins 42. The pinion gears 40 can be positioned in the gear slots 56 such that the gear pins 42 may be pushed through the apertures 58 and the central axis of the pinion gears 40 such that the apertures 58 and receptacles 62 hold the pins 42, as well as the pinion gears 40, in place. In this implementation, the pinion gear cage 38 includes five pinion gears 40 but differentials with different quantities of pinion gears are possible. The pinion gears 40 can have a bore 64 and radially-outwardly facing gear teeth around the circumference of the pinion gears 40. The gear teeth can be straight cut gear teeth in one implementation. The number of gear teeth on the pinion gears 40 can be chosen based on different factors, such as the number of teeth on face gears 66 included with the output shafts 44.

Output shafts 44 can include the face gear 66 having gear teeth shaped to mesh with the gear teeth of the pinion gears 40. The face gear 66 can be positioned at a distal end of the output shaft 44 and have a disk-shaped surface 68 that is substantially perpendicular to an axis of output shaft rotation (x) and substantially parallel to a gear face of the pinion gears 40. In one implementation, the output shaft 44 can be cast from metal and include an annular shoulder 70 in which straight gear teeth are formed at the time of casting. In other implementations, the annular shoulder 70 and disk-shaped surface 68 can be relatively smooth, with straight gear teeth cut into the surface 68 after casting.

The housing 46 can be substantially tubular with a cavity for receiving the differential 24 and output shafts 44. The outer surface of the housing 46 can couple with the rotor 34 to prevent the angular displacement of the housing 46 relative to the rotor 34. In this implementation, the housing 46 can be concentrically received by the rotor 34 and mechanically attached such that when the rotor 34 rotates relative to the stator 32, the housing 46 rotates as well. The housing 46 can be made from any one of a variety of materials, such as a metal alloy. At an axial midpoint along the housing 46, a radially-inwardly facing surface can include gear teeth shaped to engage the ring gear 48 on the pinion gear cage 38 thereby preventing the angular displacement of the cage 38 relative to the housing 46 when the cage 38 is received within the housing 46. The face gears 66 of the output shafts 44 can be received within the housing 46 such that the face gears 66 engage with the pinion gears 40 while an end of the output shafts 44 can extend beyond the housing 46 to couple with an input 72 of the reduction gearbox 26 (shown in FIG. 2). Bearings 74 can be positioned within the housing 46 around an outer surface of the output shafts 44 and engaging the radially-inwardly-facing surface of the housing 46 to provide support. C-clips 76 can be received within grooves included in the housing 46 to axially constrain the elements received within the housing 46.

Returning to FIG. 2, the reduction gearbox 26 couples the output shafts 44 from the differential 24 to the driven wheels 28 of the BEV 10. The amount of gear reduction can be selected based on the torque loads permitted by the face gears 66 engaging the pinion gears 40. In one implementation, the reduction gearbox 26 includes a greater than eight-to-one gear reduction ratio, which means for every eight revolutions of the output shaft 44, the driven wheel 28 is rotated once, and also means that the driven wheel 28 receives eight times the torque amount exerted at the output shaft 44. It is possible that other implementations use a larger gear ratio. Also, it should be appreciated that reduction gearboxes 26 can be implemented in any one of a number of ways. In this implementation, the reduction gearboxes 26 can be a two-stage reduction gearbox having three shafts. An input shaft 78 includes a drive gear 80 that is smaller than a driven gear 82 coupled to an intermediary shaft 84. The intermediary shaft 84 can include a drive gear 80 that engages with a driven gear 82 on a gearbox output shaft 86 that is ultimately coupled to a driven wheel 28 of the BEV 10. The drive gears 80 can have a smaller diameter and fewer teeth than the driven gears 82.

As the rotor 34 rotates relative to the stator 32 in response to the flow of electrical current through the stator windings, the housing 46 can rotate thereby communicating torque to the differential 24 through the housing 46. The housing 46 transmits torque to the pinion gear cage 38, through the pinion gears 40 to the face gears 66 of the output shafts 44. The output shafts 44 can turn the drive wheels 28 through the reduction gearboxes 26. As the BEV 10 operates, one drive wheel 28 may turn at a different speed than another drive wheel 28. The differential 24 can compensate for this difference in angular velocity between output shafts 44 by virtue of the rotation of the pinion gears 40 permitting angular displacement of one output shaft relative to another.

Figure 10:
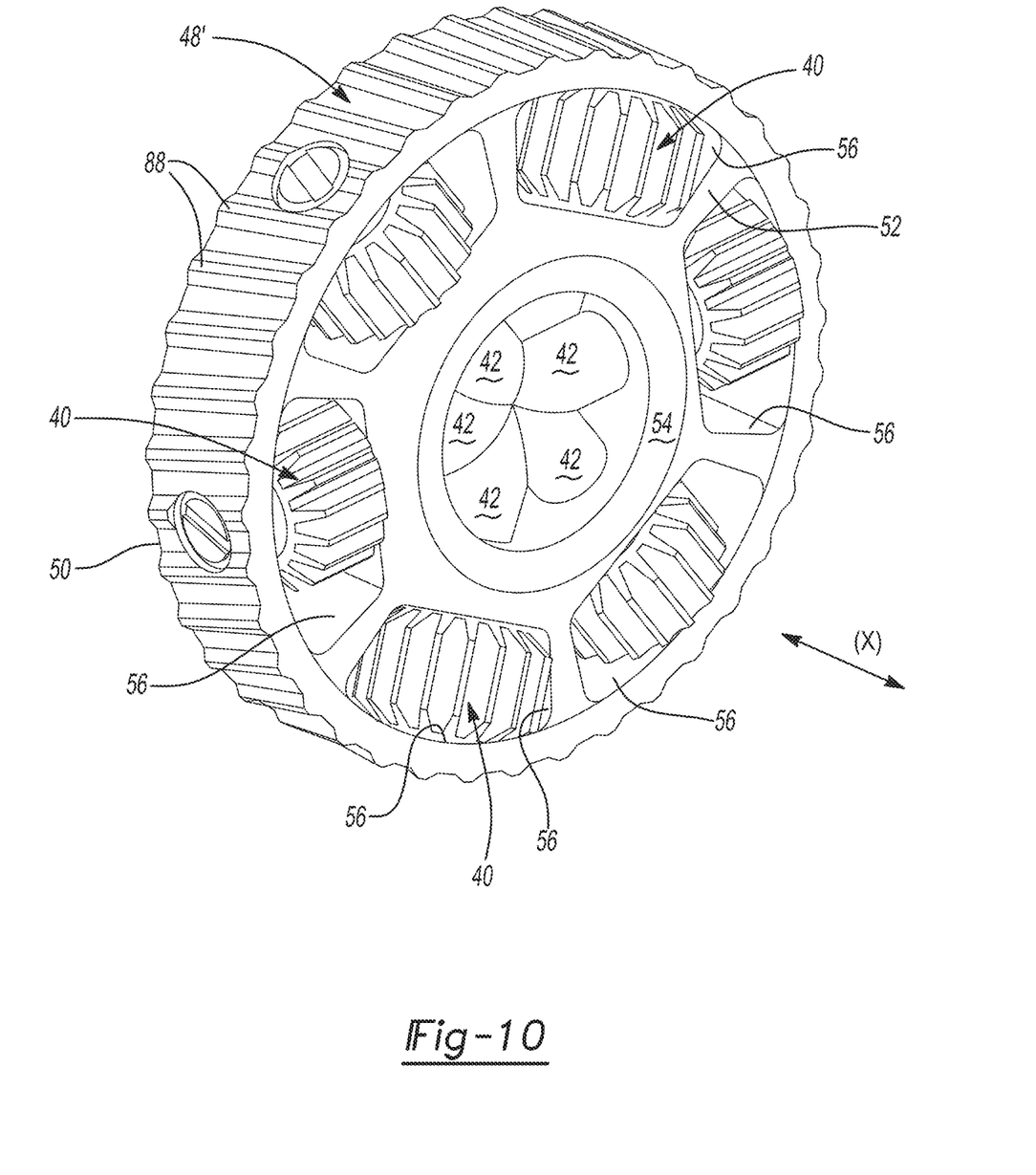
FIG. 10 is a perspective view depicting an implementation of a portion of a differential used in an electric drive system of a BEV.
Figure 11:
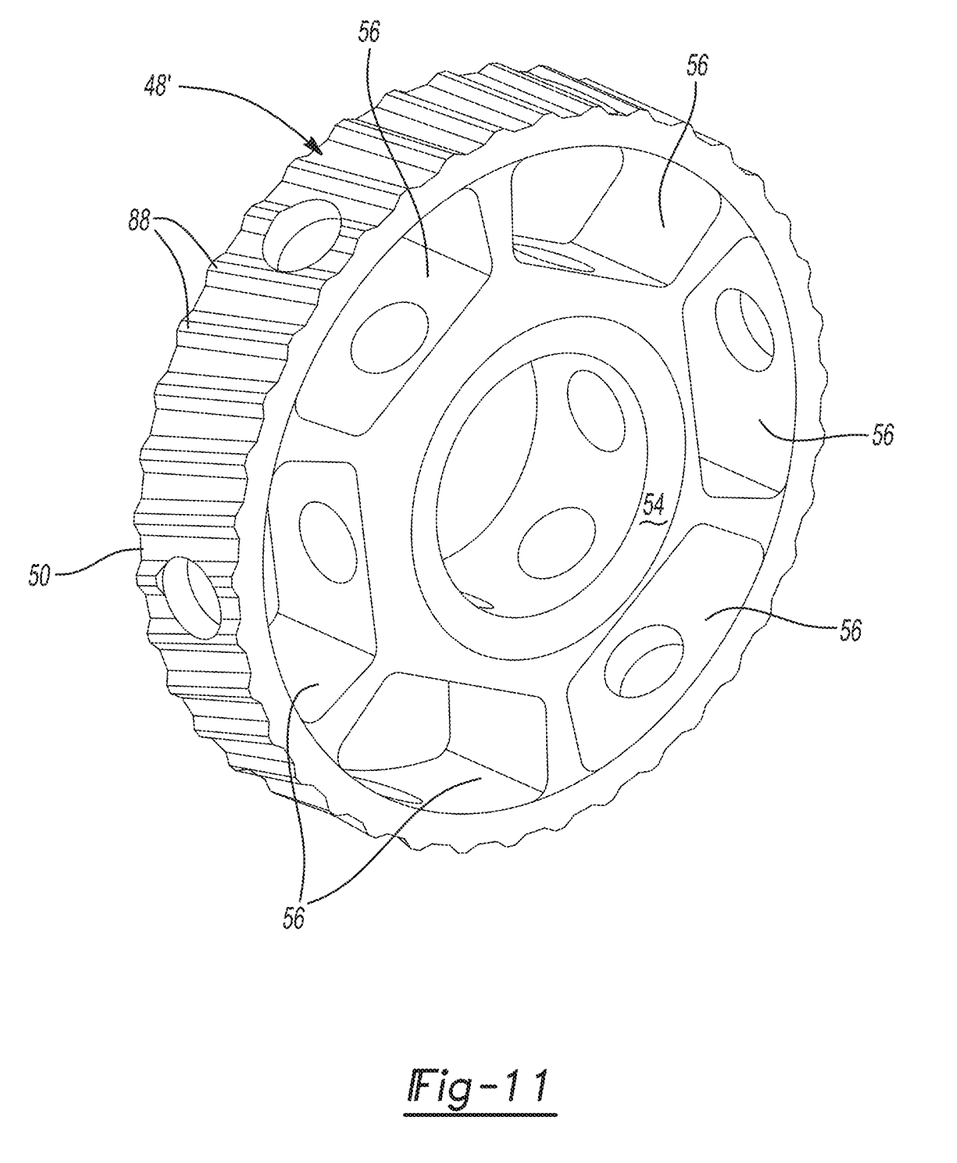
FIG. 11 is another perspective view depicting an implementation of a portion of a differential used in an electric drive system of a BEV.

FIGS. 10 and 11 depict another implementation of a pinion gear cage 38' and ring gear 48' is shown. The outer surface of a housing 46' can couple with the rotor 34 to prevent the angular displacement of the housing 46' relative to the rotor 34. In this implementation, the pinion gear cage 38' can include radially-outwardly-facing gear teeth 88 oriented at an angle relative to an axis of rotation (x). The pinion gear cage 38' can be concentrically received by the housing 46'. The housing 46' can be concentrically received by the rotor 34 and mechanically attached such that when the rotor 34 rotates relative to the stator 32, the housing 46' rotates as well. The housing 46' can be made from any one of a variety of materials, such as a metal alloy. At an axial midpoint along the housing 46', a radially-inwardly facing surface can include gear teeth oriented at the angle of the radially-outwardly-facing gear teeth 88 so that the teeth engage each other and mesh. The radially-outwardly-facing gear teeth 88 are positioned at some non-zero angle relative to the axis of rotation (x) thereby preventing the angular as well as axial displacement of the cage 38 relative to the housing 46 when the cage 38' is received within the housing 46. The face gears 66 of the output shafts 44 can be received within the housing 46 such that the face gears 66 engage with the pinion gears 40 while an end of the output shafts 44 can extend beyond the housing 46' to couple with an input 72 of the reduction gearbox 26 (shown in FIG. 2). The magnitude of the angle of orientation between the outwardly-facing gear teeth and the axis of rotation can be chosen based on a variety of factors, such as the amount of torque transmitted from the rotor 34 to the housing 46' through the ring gear 48'. The orientation of the outwardly-facing gear teeth 88 can locate the ring gear 48' axially relative to the housing 46' and prevent the ring gear 48' from both axial and rotational movement relative to the housing 46' when the teeth 88' engage correspondingly-shaped teeth positioned on the housing 46'.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An electric drive system in a battery electric vehicle (BEV), comprising:
   an output shaft, configured to couple with a drive wheel of the BEV, having a face gear at a distal end;
   a differential, including a pinion gear cage receiving pinion gears rotatably connected to the pinion gear cage via gear pins, having radially-outwardly-facing gear teeth that are oriented at a non-zero angle relative to an axis of rotation; and
   a housing receiving the differential that is configured to couple to a rotating electrical machine of the BEV, and engages the radially-outwardly-facing gear teeth preventing radial and axial movement of the differential relative to the housing, wherein the pinion gears engage the face gear and permit angular displacement of the output shaft relative to another output shaft;
   wherein the pinion gear cage includes a central hub, spokes, pinion gear slots and apertures on an outer surface of the pinion gear cage that receive the gear pins and rotatable secure the pinion gears relative to the pinion gear cage.

2. The electric drive system recited in claim 1, wherein a rotor of the rotating electrical machine concentrically receives the housing.

3. The electric drive system recited in claim 1, wherein a gear ratio between the drive wheel of the BEV and the output shaft is greater than or equal to eight to one.

4. The electric drive system recited in claim 1, further comprising receptacles in the central hub that receive the gear pins.

5. The electric drive system recited in claim 1, further comprising bearings positioned between an outer surface of the output shaft and the housing.

6. The electric drive system as set forth in claim 1, wherein, at an axial midpoint of the housing, a radially-inwardly facing surface includes gear teeth oriented at the angle of the radially-outwardly-facing gear teeth such that the gear teeth of the radially-inwardly facing surface and the radially-outwardly-facing gear teeth engage each other and mesh.

7. An electric drive system in a battery electric vehicle (BEV), comprising:
- an output shaft, configured to couple with a drive wheel of the BEV, having a face gear at a distal end;
- a differential, including a pinion gear cage receiving pinion gears rotatably connected to the pinion gear cage via gear pins, having radially-outwardly-facing gear teeth that are oriented at a non-zero angle relative to an axis of rotation;
- a housing receiving the differential that is configured to couple to a rotating electrical machine of the BEV, and engages the radially-outwardly-facing gear teeth preventing radial and axial movement of the differential relative to the housing; and
- one or more reduction gearboxes coupled to the output shaft and configured to couple to the drive wheel of the BEV, wherein the pinion gears engage the face gear and permit angular displacement of the output shaft relative to another output shaft;
- wherein the pinion gear cage includes a central hub, spokes, pinion gear slots and apertures on an outer surface of the pinion gear cage that receive the gear pins and rotatable secure the pinion gears relative to the pinion gear cage.

8. The electric drive system recited in claim 7, wherein a rotor of the rotating electrical machine concentrically receives the housing.

9. The electric drive system recited in claim 7, wherein a gear ratio between the drive wheel of the BEV and the output shaft is greater than or equal to eight to one.

10. The electric drive system recited in claim 7, wherein the one or more reduction gearboxes includes a two-stage-reduction gearbox.

11. The electric drive system recited in claim 7 further comprising receptacles in the central hub that receive the gear pins.

12. The electric drive system recited in claim 7, further comprising bearings positioned between an outer surface of the output shaft and the housing.

13. The electric drive system as set forth in claim 7, wherein, at an axial midpoint of the housing, a radially-inwardly facing surface includes gear teeth oriented at the angle of the radially-outwardly-facing gear teeth such that the gear teeth of the radially-inwardly facing surface and the radially-outwardly-facing gear teeth engage each other and mesh.

* * * * *